United States Patent
Takahashi et al.

(10) Patent No.: US 9,746,729 B2
(45) Date of Patent: Aug. 29, 2017

(54) LIQUID CRYSTAL DISPLAY

(71) Applicant: Japan Display Inc., Minato-ku (JP)

(72) Inventors: Hideyuki Takahashi, Tokyo (JP); Masakatsu Kitani, Tokyo (JP); Seiichi Sato, Tokyo (JP); Masato Nakamura, Tokyo (JP); Koji Yamamoto, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/834,962

(22) Filed: Aug. 25, 2015

(65) Prior Publication Data

US 2016/0062196 A1 Mar. 3, 2016

(30) Foreign Application Priority Data

Aug. 29, 2014 (JP) ................................. 2014-175035

(51) Int. Cl.
*G02F 1/1335* (2006.01)
*G02F 1/1362* (2006.01)
*G09G 3/36* (2006.01)
*G02F 1/1343* (2006.01)

(52) U.S. Cl.
CPC .. *G02F 1/136227* (2013.01); *G02F 1/133514* (2013.01); *G02F 1/136286* (2013.01); *G09G 3/36* (2013.01); *G02F 1/134363* (2013.01); *G02F 2201/52* (2013.01)

(58) Field of Classification Search
None
See application file for complete search history.

(56) References Cited

U.S. PATENT DOCUMENTS

| | | | |
|---|---|---|---|
| 2009/0322802 A1 | 12/2009 | Noguchi et al. | |
| 2011/0141386 A1* | 6/2011 | Kira | G02F 1/133514 349/41 |
| 2015/0001543 A1* | 1/2015 | Moon | H01L 27/1244 257/72 |

FOREIGN PATENT DOCUMENTS

JP 2010-033014 2/2010

* cited by examiner

*Primary Examiner* — Richard Kim
(74) *Attorney, Agent, or Firm* — Oblon, McClelland, Maier & Neustadt, L.L.P.

(57) ABSTRACT

According to one embodiment, there is a third column of third color (Blue) pixels and fourth (White) color pixels arranged alternately. The first set of a first (Red), a second (Green) and a third (Blue) color pixels along the first direction, and the second set of a first (Red), a second (Green) and a fourth (White) color pixels along the first direction are each defined as a composite color unit pixel. In the composite color unit pixels located at the first or second one along the first direction from composite color unit pixels to which color pixels of the third columns belongs, a connection pattern is designed that the pixels of the third columns are connected to the odd-numbered gate lines and the even-numbered gate lines, alternately, along the first direction.

10 Claims, 8 Drawing Sheets

F I G. 8

LIQUID CRYSTAL DISPLAY

CROSS-REFERENCE TO RELATED APPLICATIONS

This application is based upon and claims the benefit of priority from Japanese Patent Application No. 2014-175035, filed Aug. 29, 2014, the entire contents of which are incorporated herein by reference.

FIELD

Embodiments described herein relate generally to a liquid crystal display.

BACKGROUND

In a liquid crystal display device of color display, a plurality of pixels are arranged in a first direction (X direction) and a second direction (Y direction). The first direction (X direction) intersects the second direction (Y direction). Each pixel comprises a color filter and operates as a red pixel (R), a green pixel (G) or a blue pixel (B).

In recent years, a technique of improving display luminance of a liquid crystal display has been proposed. As an example, a red pixel (R), a green pixel (G), a blue pixel (B) and a white pixel (W) are arranged in a predetermined order along the first direction, and this one set constitutes one composite color unit pixel. A white pixel (W) has a higher efficiency of use of light as compared to a red pixel (R), a green pixel (G) or a blue pixel (B), and the transmissivity of is about three times that a red pixel (R), a green pixel (G), and a blue pixel (B). Therefore, if a white pixel (W) is used in a composite color unit pixel, the brightness of the display device can be raised.

Liquid crystal display devices employ a liquid crystal drive mode in order to improve the liquid-crystal drive efficiency. More specifically, pixel columns of each adjacent pair are driven by drive voltage of different polarities, and the polarity is inverted from one frame to another. This drive mode is sometimes called a column inversion driving mode.

DETAILED DESCRIPTION

Various embodiments will be described hereinafter with reference to the accompanying drawings.

As a liquid crystal driving mode, the column inversion driving mode is effective when the composite color unit pixels of a liquid crystal display are formed three color pixels of a red pixel (R), a green pixel (G) and a blue pixel (B). But when the composite color unit pixel is formed of four color pixels of a white pixel (W), a red pixel (R), a green pixel (G), and a blue pixel (B), the polarity inversion in the color pixels may not be carried out properly by the conventional column inversion driving mode. For example, let us suppose the case where the first and second blue pixels (B) are arranged in different columns and pixel signals supplied to these pixels are of the same level. In this case, the voltage polarity of the pixel signals supplied to the first and second blue pixels (B) are not inverted between columns (column inversion) and therefore, the voltages of the pixel signals are not balanced (equalized). As a result, for example, the reference voltage of the common electrode may be biased toward a positive or negative side. The blue pixels (B) thus biased cause adverse effect on the accurate color reproduction of an image.

As a solution, according to this embodiment, there is provided a liquid crystal display which can properly obtain the effect of polarity-inversion driving of color pixels, thus enabling to improve the color reproduction performance power.

In the display device of this embodiment, a set of three columns, namely, a first column of red (first color) pixels, a second column of green (second color) pixels and a third column of blue (third color) pixels and white (fourth color) pixels alternately arranged, is repeatedly provided in the first direction, and a first set of a red (first color) pixel, a green (second color) pixel and a blue (third color) pixel arranged along the first direction, and a second set of a red (first color) pixel, a green (second color) pixel and a white (fourth color) pixel are each defined as a composite color unit pixel. Further, odd-numbered and even-numbered gate lines are provided for the arrangement of pixels to correspond to the odd-numbered and even-numbered columns, respectively.

In the composite color unit pixel located at the first or second one along the first direction from a composite color unit pixel to which a pixel of the third column belongs, such a pattern is formed along the first direction that the pixels of the third column are connected respectively to odd-numbered gate lines and even-numbered gate lines, alternately.

Embodiments will be further described with reference to the drawings.

Note that throughout the drawings, structural members which exhibit identical or similar functions are designated by the same referential symbols, and explanations therefor will not be repeated.

Figure 1:
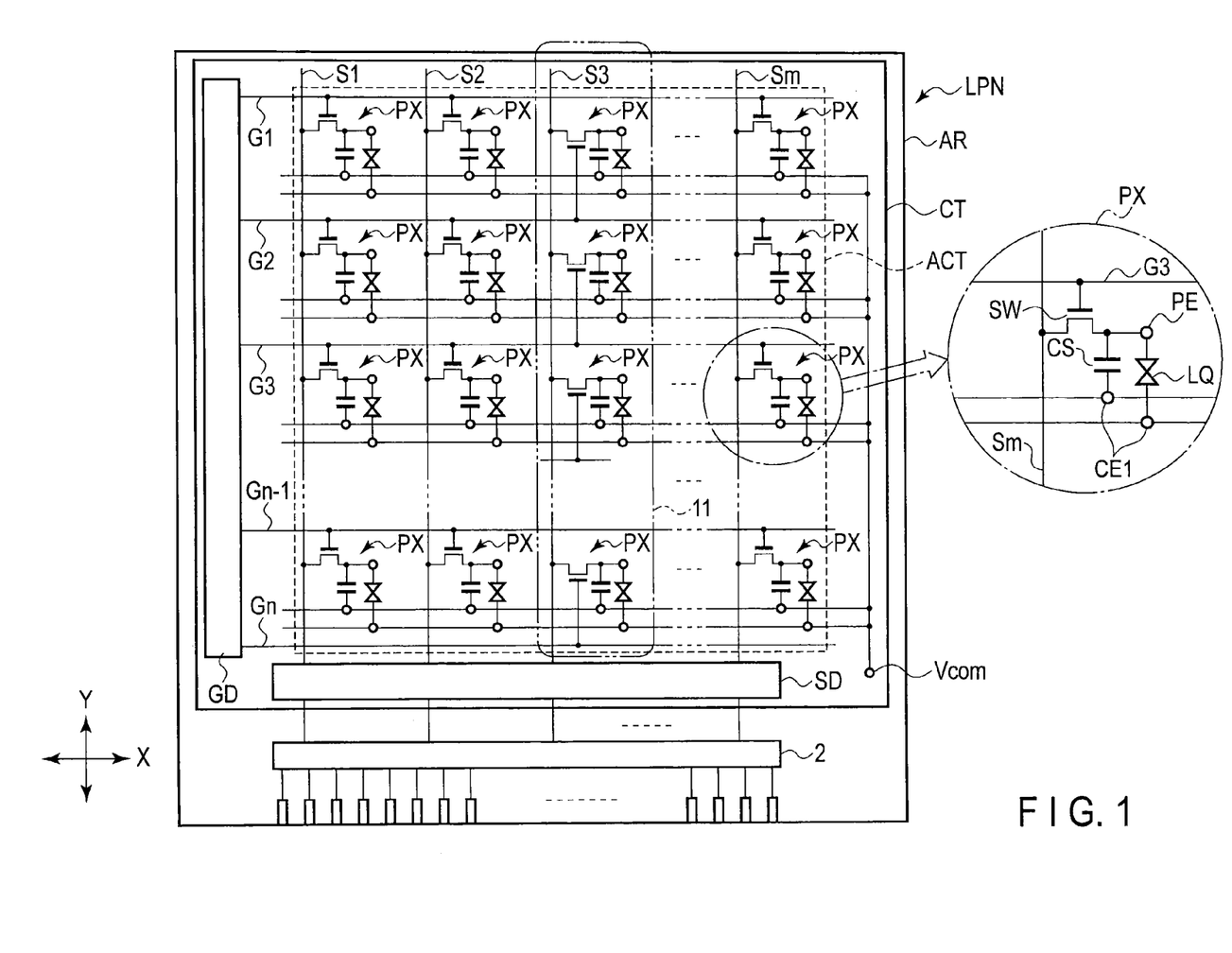
FIG. 1 is a diagram briefly showing a structure of a liquid crystal display panel LPN which is a part of a display device of this embodiment, and an equivalent circuit thereof.

FIG. 1 briefly shows a structure of a liquid crystal display panel LPN which is a part of a display device of this embodiment, together with an equivalent circuit thereof.

The display device comprises an active-matrix type liquid crystal display panel LPN. The liquid crystal display panel LPN comprises an array substrate AR as a first substrate, a counter-substrate CT as a second substrate, opposing the array substrate AR, and a liquid crystal layer LQ held between the array substrate AR and the counter-substrate CT.

The liquid crystal display panel LPN comprises an active area ACT (area enclosed by a dotted line in the figure) configured to display images. The active area ACT corresponds to a region where the liquid crystal layer LQ is held between the array substrate AR and the counter-substrate CT, having, for example, a quadrangular shape, and comprises a plurality of pixels PXs arranged in a matrix.

The array substrate AR comprises, in the active area ACT, a plurality of gate lines G (G1 to Gn) extending along the first direction X, and source lines S (S1 to Sm) extending along the second direction Y which intersects the first direction X.

As shown in the right-hand side of the figure as a typical example (region enclosed by an alternate long and short dash line), each pixel PX comprises a switching element SW electrically connected to a respective gate line G and a respective source line S, a pixel electrode PE electrically connected to the switching element SW (in each pixel PX), a common electrode CE1 opposing the pixel electrode PE, etc. According to the figure, there are apparently two common electrodes present, but in reality, there is only one integrated common electrode CE1. A storage capacitance CS is formed, for example, between the common electrode CE1 and the pixel electrode PE. On the other hand, the counter-substrate CT is set to oppose the array substrate AR with the liquid crystal layer LQ therebetween.

Each gate line G is led outside of the active area ACT and is connected to a first driving circuit GD. Each source line S is led outside of the active area ACT and is connected to a second driving circuit SD.

The first driving circuit GD and the second driving circuit SD are, for example, at least partially formed on the array substrate AR and are connected to a driving IC chip (referred to as a liquid crystal driver in some cases) 2.

The second driving circuit SD is configured to output pixel signals of different polarities to source lines of columns adjacent to each other in order to realize the column-inversion drive scheme.

The driving IC chip 2 includes a built-in controller configured to control the first driving circuit GD and the second driving circuit SD, and functions as a signal supply source to supply signals required to drive the liquid crystal display panel LPN.

In the example illustrated, the driving IC chip 2 is mounted on the array substrate AR outside of the active area ACT of the liquid crystal display panel LPN.

The common electrode CE1 extends over the entirety of the active area ACT, and is formed in common to a plurality of pixels PXs. The common electrode CE1 is led outside of the active area ACT, and is connected to a power supply module Vcom. The power supply module Vcom is formed on the array substrate AR, for example, outside of the active area ACT, and is electrically connected to the common electrode CE1. A constant common voltage is supplied to the power supply module Vcom.

Color filters are arranged at a predetermined rule on the pixels PXs. Each colored filter is formed on the counter-substrate CT while opposing a pixel electrode with the liquid crystal layer LQ therebetween.

Figure 2:
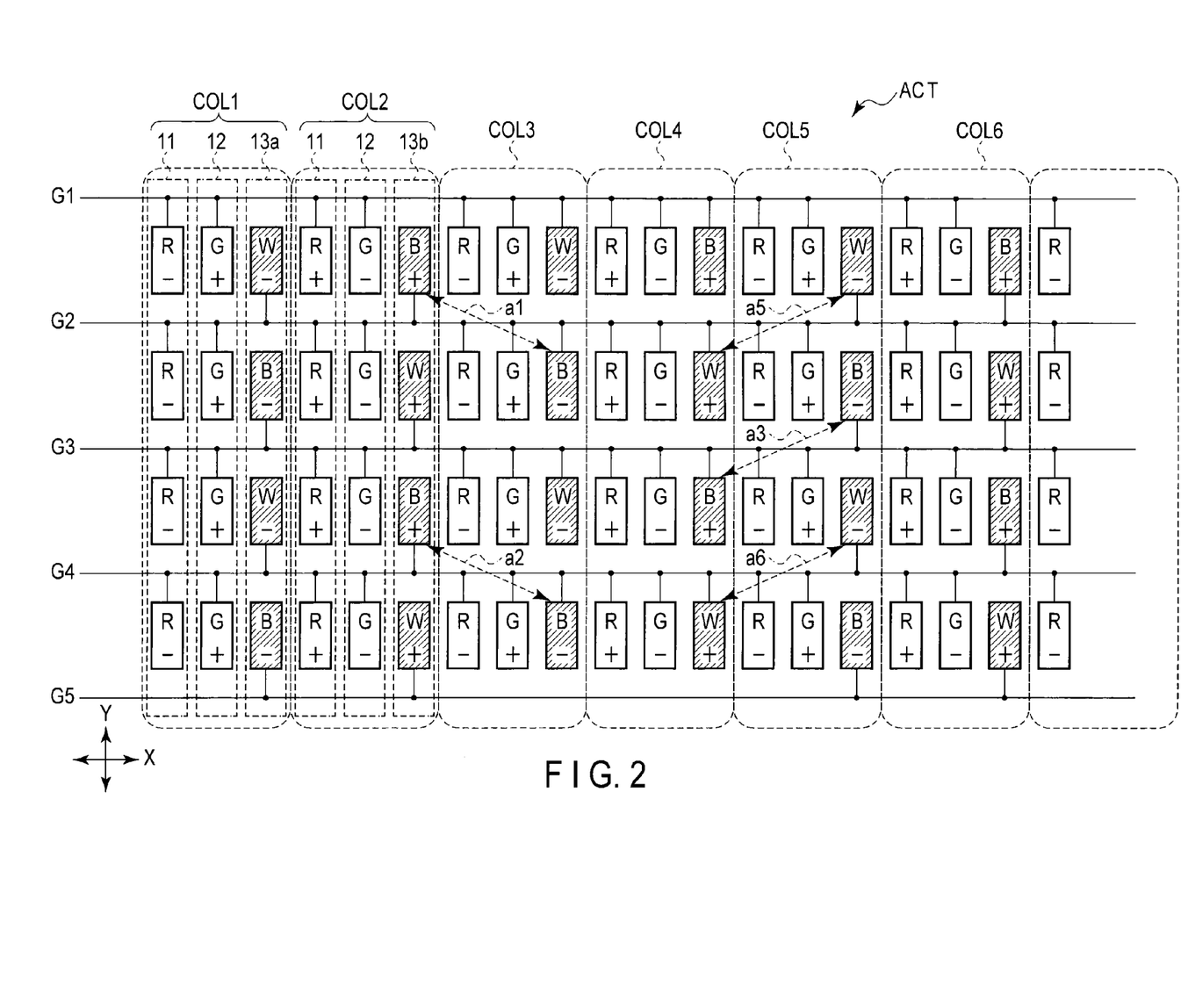
FIG. 2 is a diagram showing an example of color filters arranged on the pixels PX.

FIG. 2 shows an example of the arrangement of colored filters for the pixels PX. A pixel integrated with a respective color filter will be hereinafter called a color pixel, and those integrated with red, green, blue and white filters will be called a red (first color) pixel (R), a green (second color) pixel (G), a blue (third color) pixel (B) and a white (fourth color) pixel (W), respectively.

In this embodiment, a first column 11 of red (first color) pixels, a second column 12 of green (second color) pixels, and a third column 13a or 13b which occurs alternately between blue (third color) pixel and white (fourth color) pixel are repeatedly provided along the first direction. Note that the third column is denoted by one of two types of reference numerals, 13a and 13b, in which a blue pixel (B) and a white pixel appear alternately, and in one type, blue pixels (B) are provided in odd-numbered rows and white pixels (W) are provided in even-numbered rows, whereas in the other type, white pixels (W) are provided in odd-numbered rows and blue pixels (B) are provided in even-numbered rows as the arrangement rule.

Further, in this embodiment, a set of the red pixel (R), green pixel (G) and blue pixel (B) and a set of the red pixel (R), a green pixel (G) and a white pixel (W), arranged along the first direction, are each defined as a composite color unit pixel. In the figure, columns of composite color unit pixels are designated by reference signs, COL1, COL2, COL3, COL4, . . . . The columns COL1, COL2, COL3, COL4, . . . , of the composite color unit pixels each include the first column 11, the second column 12 and the third column 13a (or 13b).

Next, gate lines G1, G2, G3, G4, . . . , are provided along the first direction to correspond to the respective rows of pixels.

Let us focus here on the pixels of the third column. The pixels of the third column are connected to odd-numbered gate lines and even-numbered gate lines alternately every two composite color unit pixels. That is, in the example of FIG. 2, the pixels of the third column are white pixels (W) or blue pixels (B). Here, let us focus on, for example, the white pixels (W) in the first row. In column COL1 of the composite color unit pixels, its white pixel (W) is connected to the gate line G2, but, skipping the next column, column COL2, in column COL3 of the composite color unit pixels, its white pixel (W) is connected to the gate line G1. Further, skipping the column COL4, in column COL5 of the composite color unit pixels, its white pixel (W) is connected to the gate line G2. To summarize, every two composite color unit pixels, the pixels of the third column are connected to odd-numbered gate lines and even-numbered gate lines, alternately.

Similarly, in terms of blue pixels (B) of the third column along the first direction, the blue pixels (B) are connected alternately to the odd-numbered gate lines and the even-numbered gate lines every two composite color unit pixels as in the case of the white pixels (W).

The display device configured as above exhibits the following advantageous effect. Let us suppose now that pixel signals of the same potential are written (input) to the pixels except the following.

That is, let us suppose that, for example, when pixel signals are written in pixels of one row, those of odd-numbered columns are supplied with pixel signals of a potential of a negative direction with respect to the common potential of the common electrode, whereas those of even-numbered columns are supplied with pixel signals of a potential of a positive direction.

Here, the write-in process of a pixel signal to, for example, red pixels (R) will be focused. When, for example, the gate line G1 is on, in terms of the first direction, a pixel signal (negative potential) is written in the red pixels (R) of columns COL1, COL3, COL5, . . . , and a pixel signal (positive potential) is written in the red pixels (R) of column COL2, COL4, COL6, . . . . Therefore, along the first direction, the polarities of the red pixels (R) regularly flip as +, −, +, −, . . . . In this manner, the polar balance of the common electrode for the red color is not biased to one of polarity. In other words, in the write-in processing of a pixel signal to the red pixels, the potential of the common electrode is not biased to the positive or negative direction.

The above is also the same as the case for the write-in processing of a pixel signal to green pixels (G). More specifically, in terms of the first direction, for example, when the gate line G1 is on, a pixel signal (positive potential) is written in the green pixels (G) of column COL1, COL3, COL5, . . . , whereas a pixel signal (negative potential) is written in the green pixels (G) of columns COL2, COL4, COL6, . . . .

Thus, in the green pixels (G) along the first direction, the polarity flips regularly as +, −, +, −, . . . . In this manner, the polar balance of the common electrode for the green pixels (G) is not biased to one of polarity. In other words, in the write-in processing of a pixel signal for the green color, the potential of the common electrode is not biased to the positive or negative direction.

Next, the write-in processing of a pixel signal to blue pixels (B) will now be focused. For example, in terms of the first direction, when the gate line G2 is on, a pixel signal (positive potential) is written in the blue pixels (B) of columns COL2, COL6, COL10 (not shown), . . . , whereas a pixel signal (negative potential) is written in the blue pixels (B) of columns COL3, COL7 (not shown), COL11 (not shown), . . . .

Here, as to the polarities of the pixel signals written in the blue pixels (B), the positive and negative polarities are equalized. Therefore, in the blue pixels (B) along the first direction, the polarity flips regularly as +, −, +, −, . . . (see arrows a1, a2, a3, . . . , for example). In this manner, the polar balance of the common electrode for the blue pixels (B) is not biased to one of polarity.

The above is also the same as the case for the write-in processing of a pixel signal to white pixels (W). More specifically, in terms of the first direction, for example, when the gate line G2 is on, a pixel signal (positive potential) is written in the white pixels (W) of column COL4, and a pixel signal (negative potential) is written in the white pixels (W) of column COL5. Here, as to the polarities of the pixel signals written in the white pixels (W), the positive and negative polarities are equalized (see arrows a5 and a6).

Figure 3:
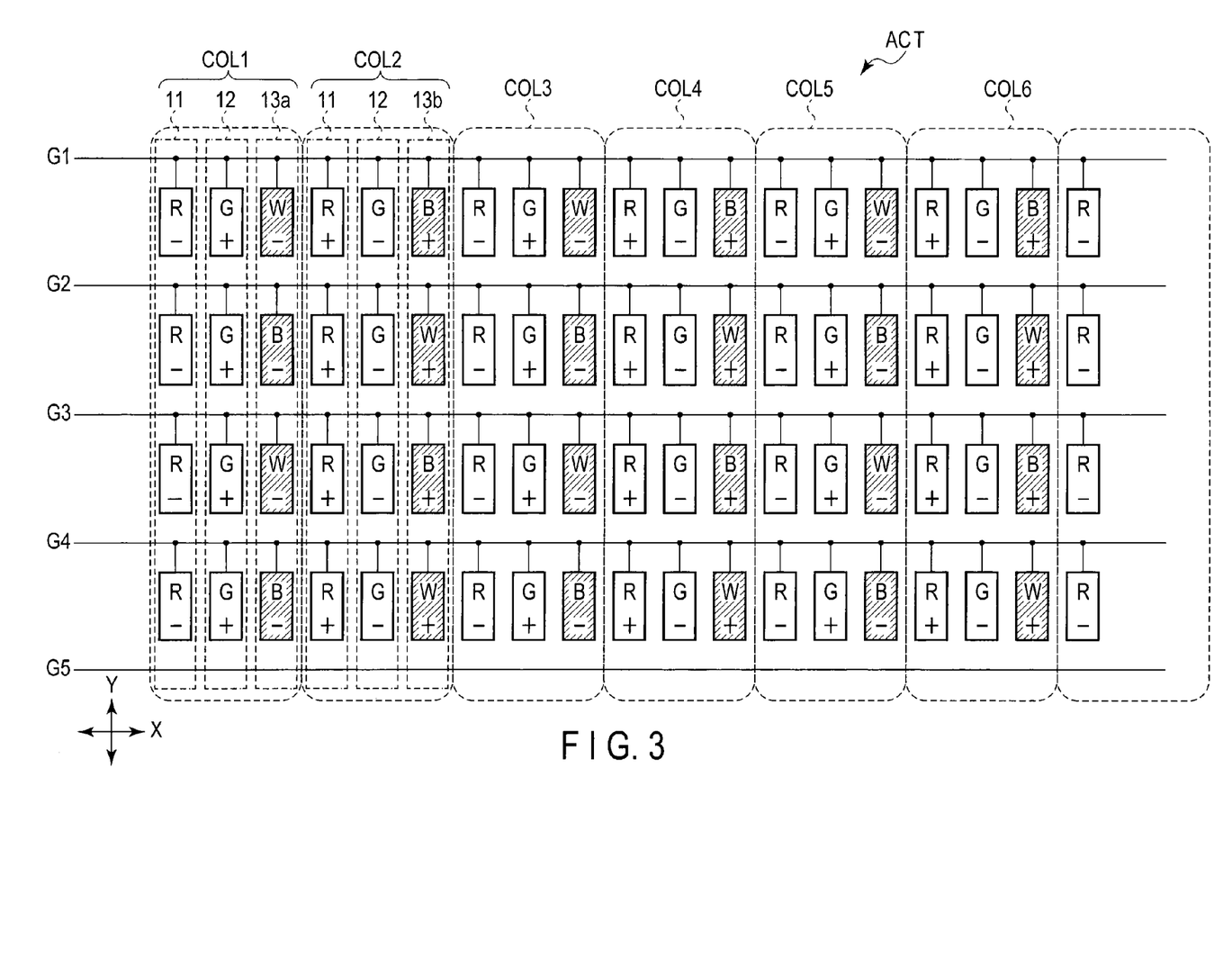
FIG. 3 is a diagram showing another example of the colored filter to be compared with the color filter of FIG. 2.

FIG. 3 shows the connection between the pixels and gate lines when such measures as shown in FIG. 2 are not taken. In such connection, the connection between the gate lines and the red pixels (R) or green pixels (G) is the same as that of the example shown in FIG. 2 and therefore the polar balance of the common electrode is the same as that of the example of FIG. 2. Therefore, an explanation therefor is omitted.

But in this connection, in terms of the first direction, for example, when the gate line G1 is on, a pixel signal of a potential of a positive side with respect to that of the common electrode is written in the blue pixels (B) of columns COL2, COL4, and COL6. Here, when the gate line G1 is on, in terms of the first direction, there is no pixel signal of a negative potential written for the blue color. Therefore, in the case of the structure of FIG. 3, the polar balance of the common electrode for the blue color is biased toward the polarity of the positive side. Further, as to the blue pixels (B) connected to the gate line G2, the polar balance of the common electrode for the blue color is biased toward the polarity of the negative side.

In the structure of FIG. 3, a similar view to that of the blue pixels (B) discussed above can be applied to the case of white pixels (W). That is, the polarity of the common electrode for the white color is biased.

In contrast, in the case of the structure discussed with reference to FIG. 2, the reference potential of the common electrode is stable for each of the color pixels (R), (G), (B) and (W).

Figure 4:
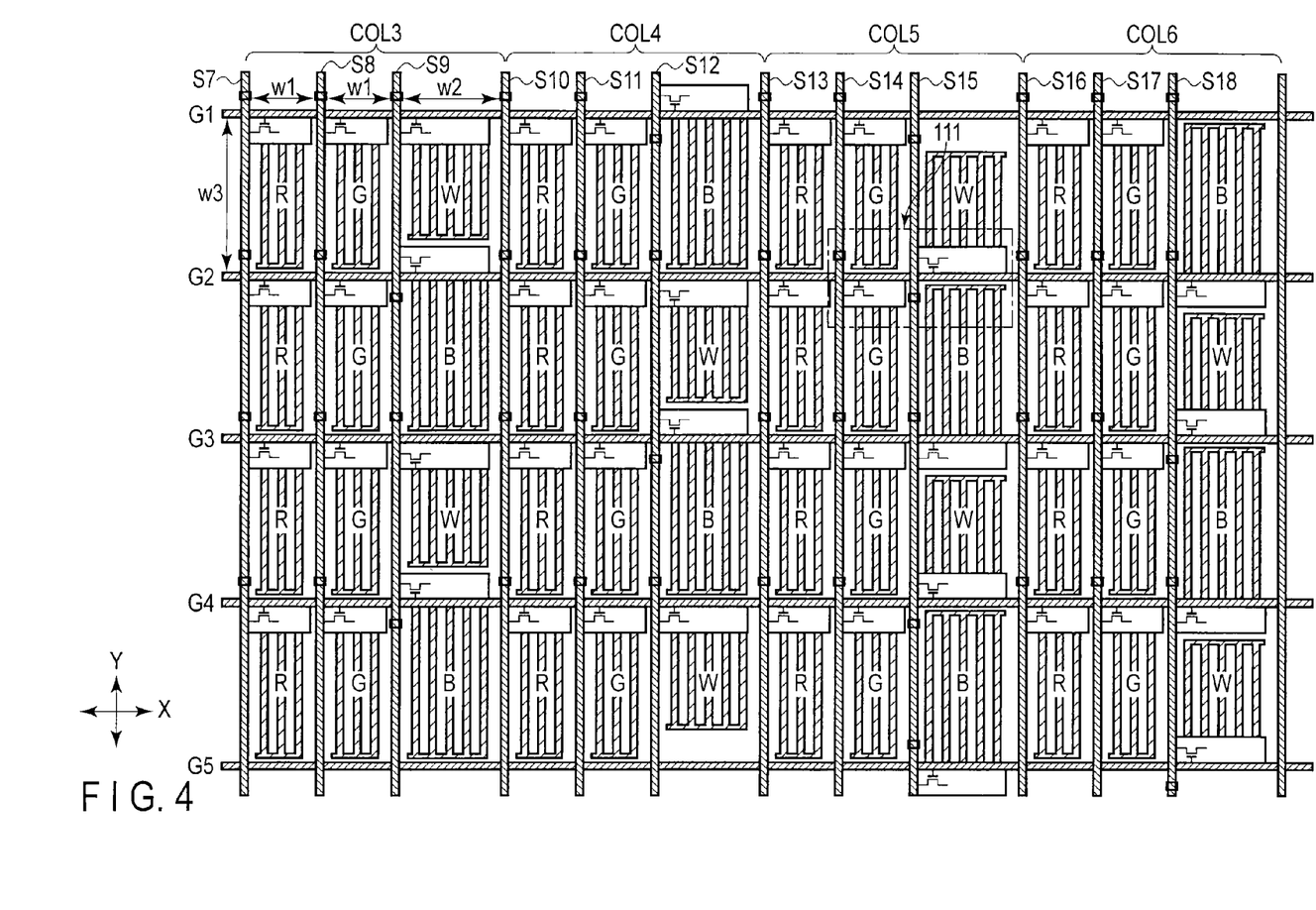
FIG. 4 is a diagram showing a more detailed structure of columns COL3, COL4, COL5 and COL6 of the composite color unit pixels shown in FIG. 2.

FIG. 4 shows a more detailed structure of columns COL3, COL4, COL5 and COL6 of the composite color unit pixels shown in FIG. 2. As compared with FIG. 2, FIG. 4 further illustrates the structure of each pixel electrode and source lines S7 to S18. Also, FIG. 4 briefly shows pixel electrodes and the connections between source lines and gate lines of the respective pixel electrodes.

A pixel electrode is connected to a respective source line by a respective switching element formed in the connection portion. The switching element is on/off-controlled by a control signal from the gate line. The structure of the connection portion will be described later with reference to FIG. 5A and FIG. 5B.

As shown in FIG. 4, in this embodiment, for the composite color unit pixels, four types of color pixels of white pixel (W), red pixel (R), green pixel (G) and blue pixel (B) are used. But if a set of four color pixels of a white pixel (W), a red pixel (R), a green pixel (G) and a blue pixel (B) are simply arranged along the first direction is defined as one composite color unit pixel, the pitch of arrangement of the composite color unit pixels becomes large, thus degrading the resolution. To avoid this, in this embodiment, the composite color unit pixels of columns COL1, COL2, COL3, COL4, . . . , are arranged in a basic unit of three-color pixels, respectively, in the first column 11, the second column 12 and the third column 13a (or 13b), as shown in FIG. 2 described. With this arrangement, the degradation of resolution is suppressed.

Further, in this embodiment, in the sequence of composite color unit pixels in the first direction, a set of a red pixel (R), a green pixel (G) and a white pixel (W) and a set of a red pixel (R), a green pixel (G) and a blue pixel (B) are repeatedly provided alternately. Let us suppose here that, for example, composite color unit pixels of two rows ((3×2) pixels) are combined. A set of a red pixel (R), a green pixel (G) and a white pixel (W) and a set of a red pixel (R), a green pixel (G) and a blue pixel (B) are provided.

Thus, in this embodiment, a two-dimensional array, (3×2), of six color unit pixels (two red pixels (R), two green pixels (G), one blue pixel (B) and one white pixel (W)) are combined as needed to devise color reproduction. That is, in order to make it easier to balance in brightness between the colors, the above-structure is designed so that the area of two red pixels (R), the area of two green pixels (G), and the area of one blue pixel (B) become equal. Therefore, with this structure, it is not necessary to concern the unbalance of the color filter areas in the signal-processing method for performing color reproduction based on red pixels (R), green pixels (G) and blue pixels (B). Here, as for the signal supplied to white pixels (W), the gain is set according to the object of adjustment in luminance and lightness.

It is designed that the area of one blue pixel (B) is substantially equally to a total area of two red pixels (R) (=total area of two green pixels (G)) described above. Therefore, in terms of the first direction, as compared to a width w1 of a red pixel (R) and a green pixel (G), a width w2 of a white pixel (W) and a blue pixel (B) is greater. Note that widths w3 of gaps between adjacent pairs of gate lines along the first direction are the same as each other.

FIG. 4 briefly shows the connections between pixels, gate lines and source lines. The connection portions will now be described in detail.

Figure 5A:
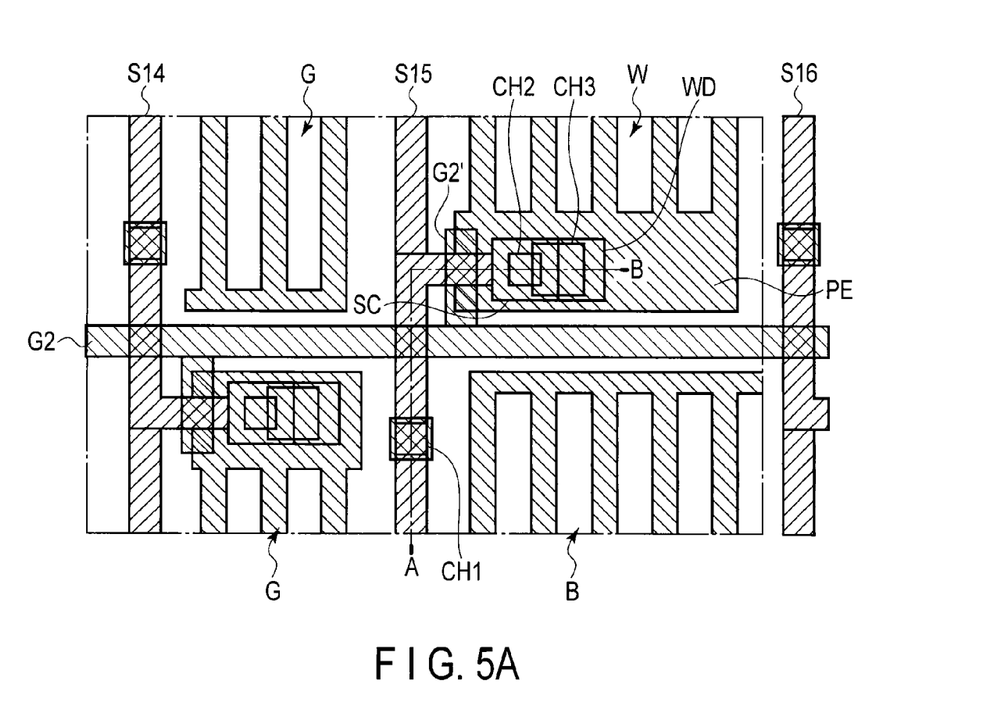
FIG. 5A is an extracted diagram of a section 111 enclosed with a square in FIG. 4.
Figure 5B:
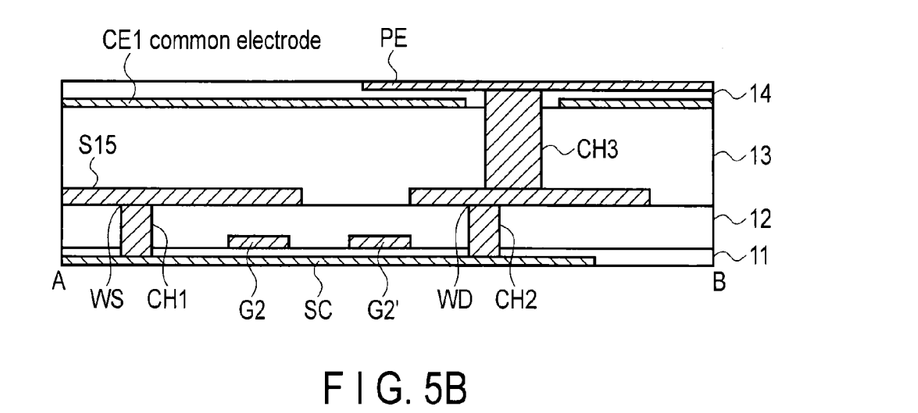
FIG. 5B is a schematic diagram showing a cross-section of the device taken along line A-B in FIG. 5A.

FIG. 5A and FIG. 5B are each an extracted diagram showing a portion 111 enclosed by a quadrangle shown in FIG. 4. FIG. 5A is an enlarged view showing a neighborhood of source lines S14, S15 and S16 and gate line G2. FIG. 5B is a schematic cross section of the device of FIG. 5A taken along line A-B. That is, the region of the white pixel (W) connected to the gate line G2 will be described in detail.

In this embodiment, a fringe field switching (FFS) system is employed, in which pixel electrodes are each formed to include a slit and the liquid crystal molecules are driven between pixel electrodes and a common electrode.

The source line S15 is located between an insulating layer 12 and an insulating layer 13. Beneath the source line S1, a semiconductor layer SC is formed via the insulating layers 12 and 11 therebetween. A source electrode WS connected to a part of the source line S15 is connected to a source of the semiconductor layer SC through a contact hole CH1. The semiconductor layer SC extends over beneath the source line S15, passes over beneath the gate line G2 and enters the region of the white pixel (W). The portion of the semiconductor layer SC which enters the region of the white pixel (W) is used as a drain.

The gate line G2 is located between the insulating layer 11 and the insulating layer 12 beneath the layer of the source line S15. A portion of the gate line G2 projects to the pixel formation region, and this portion is denoted by reference G2' in the figure.

The drain of the semiconductor layer SC is connected to a drain electrode WD through a contact hole CH2 made through the insulating layers 11 and 12. Further, the drain electrode WD is connected to the pixel electrode PE through a contact hole CH3 made through an insulating layer 13, a common electrode CE1 and an insulating layer 14. Note that the common electrode CE1 shown in FIG. 5B is not illustrated in FIG. 5A.

The pixel electrode and the source line of the green pixel (G) located between the source line S14 and the source line S15 are connected as shown in FIG. 5A, which will now be described.

The source electrode of the switching element is connected to the source line through a first contact hole, and the drain electrode of the switching element is connected to the pixel electrode through a second contact hole. Here, the first contact hole formed in the source line S14 and the second contact hole beneath the pixel electrode are located in rows adjacent to each other.

Similarly, the pixel electrode and the source line of the white pixel (W) located between the source line S15 and the source line S16 are connected as described in the following.

The source electrode of the switching element SC is connected to the source line S15 through the first contact hole CH1, and the drain electrode of the switching element SC is connected to the pixel electrode PE through the second contact hole CH2. Here, the first contact hole formed in the source line S15 and the second contact hole beneath the pixel electrode PE are located in rows adjacent to each other.

With the above-described arrangement, the contact hole for connecting the source electrode of the switching element to the source line and the contact hole for connecting the drain electrode of the switching element to the pixel electrode are located in different rows. In this manner, the degree of overcrowding of contact holes can be reduced, which enables to improve the reliability of the manufacture of the devices.

If a contact hole for connecting the source electrode of a switching element to a respective source line is located in the same column as that of a contact hole for connecting the drain electrode of a switching element to a respective pixel electrode, the density of contact holes becoming high. As a result, such a necessity arises that the accuracy of the manufacture of the devices should be improved, and also the risk of defective products being produced will become high. According to the designing of this embodiment, the degree of overcrowding of contact holes can be reduced and thus the reliability of the manufacture of the devices can be improved. That is, the contact holes can be dispersed (overcrowding being reduced), and the accuracy required for the manufacture of the devices can be relaxed. Thus, the yield of manufacture of the devices can be improved.

Further, as can be understood from FIGS. 4, 5A and 5B, the pixel electrodes of a red pixel (R), a green pixel (G) and a white pixel (W) are accommodated in area within in a first region defined by a source line and a gate line. But the pixel electrode of a blue pixel (B) trespasses from the first region defined by the source line and the gate line onto a second region located in a next column by its contact hole portion for connecting to the drain of the switching element. Therefore, when distribution between a total area of a red pixel (R) and a green pixel (G) and an area of a blue pixel (B) needs to be designed, it is easy to adjust the area of the blue pixel (B).

Figure 6:
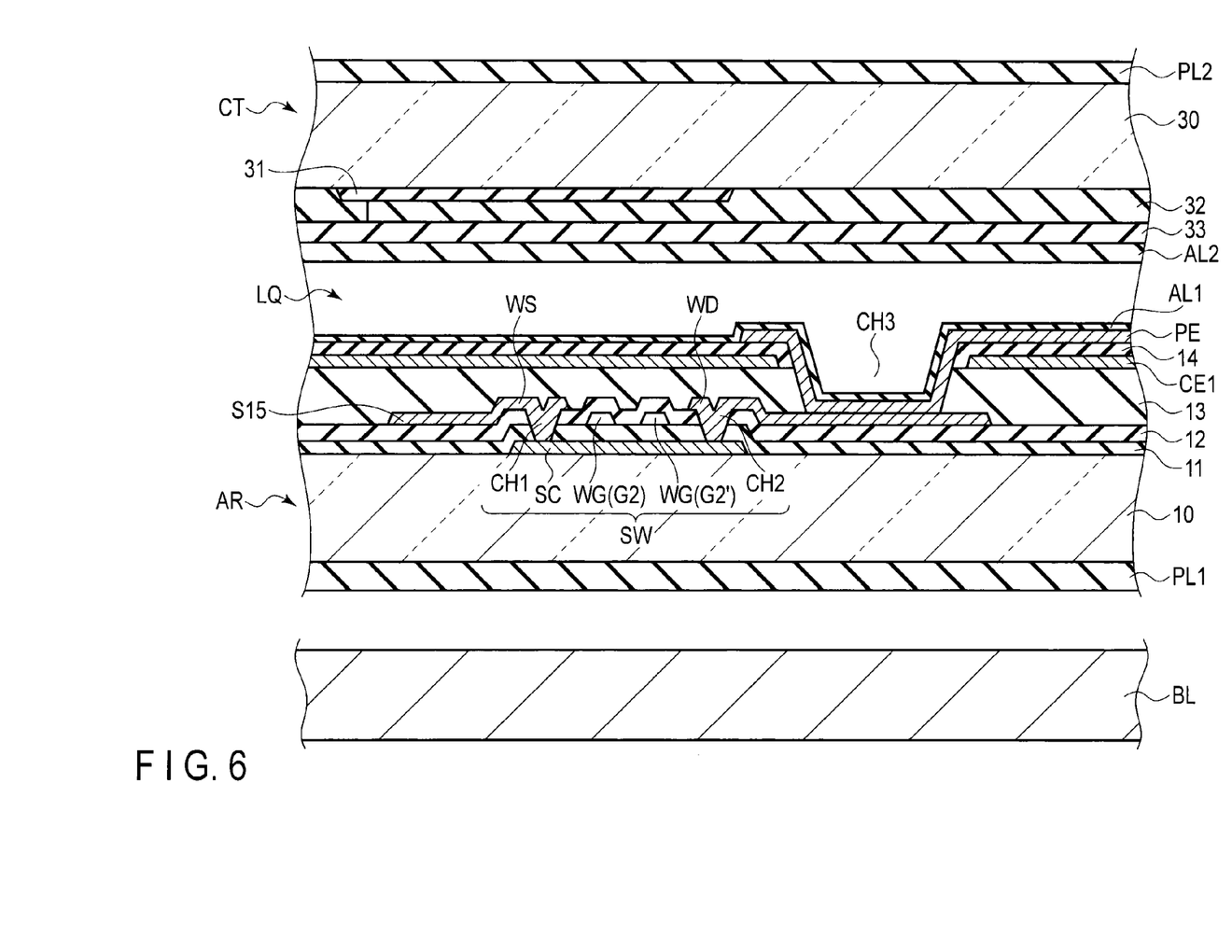
FIG. 6 is a more detailed diagram showing the section of FIG. 5B.

FIG. 6 briefly shows a cross-sectional structure of a surrounding of the connection portion including the switching element (SW) shown in FIGS. 5A and 5B.

The array substrate AR is formed from the first insulating substrate 10 having light transmissivity, such as a glass substrate and a resin substrate. The array substrate AR comprises a switching element SW, a first common electrode CE1, a pixel electrode PE, a first insulating layer 11, a second insulating layer 12, a third insulating layer 13, a fourth insulating layer 14, a first perpendicular alignment film AL1 and the like. Note that the first perpendicular alignment film AL1 may be a horizontal alignment film.

In the illustrated example, the switching element SW is a top-gate thin film transistor. The switching element SW comprises a semiconductor layer SC provided on the first insulating substrate 10. Note that an undercoat layer, which is an insulating layer, may be interposed between the first insulating substrate 10 and the semiconductor layer SC.

The semiconductor layer SC is covered by the first insulating layer 11. The first insulating layer 11 is located also on the first insulating substrate 10. The first insulating layer 11 is formed of an inorganic material such as tetraethoxysilane (TEOS).

The gate electrode WG of the switching element SW is formed on the first insulating layer 11 and is located immediately above the semiconductor layer SC. The gate electrode WG is electrically connected to gate lines G2 and G2' (or formed integrally with the gate lines) and is covered by the second insulating layer 12. The second insulating layer 12 is located also on the first insulating layer 11. The second insulating layer 12 is formed of an inorganic material such as silicon nitride.

The source electrode WS and the drain electrode WD of the switching element SW are formed on the second insulating layer 12. Similarly, the source line S15 is formed on the second insulating layer 12. The source electrode WS illustrated in the figure is electrically connected to the source line S15 (or formed integrally with the source line S15). The source electrode WS and the drain electrode WD are in contact with the semiconductor layer SC through the contact holes CH1 and CH2 which penetrate the first insulating layer 11 and the second insulating layer 12, respectively. The switching element SW is covered by the third insulating layer 13 with the source line S15. The third insulating layer 13 is located also on the second insulating layer 12. The third insulating layer 13 is formed of a transparent resin material, for example.

The common electrode CE1 extends on the third insulating layer 13. As shown, the common electrode CE1 covers the source line S15 from above, and extends towards an adjacent pixel. The common electrode CE1 is formed of a transparent conductive material such as indium tin oxide (ITO) or indium zinc oxide (IZO).

The fourth insulating layer 14 is provided on the common electrode CE1.

A contact hole CH3 is formed in the third insulating layer 13 and the fourth insulating layer 14 so as to penetrate even to the drain electrode WD. The fourth insulating layer 14 is formed thinner as compared to that of the third insulating layer 13 and is formed of an inorganic material such as silicon nitride. The fourth insulating layer 14 is equivalent to an interlayer insulation film which covers the common electrode CE1.

The pixel electrode PE having a slit is formed on the fourth insulating layer 14 such as to oppose the first common electrode CE1. The pixel electrode PE is electrically connected to the drain electrode WD of the switching element SW through the contact hole CH3. The pixel electrode PE is formed of, for example, a transparent conductive material such as ITO or IZO. The pixel electrode PE is covered by the first perpendicular alignment film AL1.

On the other hand, the counter-substrate CT is formed from the second insulating substrate 30 having light transmissivity, such as a glass substrate or a resin substrate. The counter-substrate CT comprises, on a side of the second insulating substrate 30, which opposes the array substrate AR, a light-shielding layer 31, a color filter 32, an overcoat layer 33, a second perpendicular alignment film AL2 and the like.

The light-shielding layer 31 partitions the pixels PX in the active area ACT and forms an opening.

The light-shielding layer 31 is provided in the boundary between color pixels or in a position which opposes the source line formed on the array substrate AR. The light-shielding layer 31 is formed of a light-blocking metal material or a black resin material.

The color filter 32 is formed on an aperture AP and a part thereof overlaps the light-shielding layer 31. In the example shown here, the color filter 32 is, for example, white and formed of a color-free resin material. In the case of a red filter, a resin material colored red is used. Similarly, in the case of a green filter, a resin material colored green is used, and for a blue filter, a resin material colored blue is used.

The red filter is provided on a red pixel (R) which displays red, the green filter is provided on a green pixel (G) which displays green, and the blue filter is provided on a blue pixel (B) which displays blue. Further, a white (or transparent) filter is provided on a white pixel (W) which displays white. Note that a color filter may not be provided for a white pixel (W). Moreover, the white filter may not be an absolutely colorless filter, but may be a pale color filter (for example, in thin yellow). The boundary between color filters of different colors is located in a position which overlaps with the light-shielding layer above the respective source line.

The overcoat layer 33 covers the color filter 32. The overcoat layer 33 planarizes surface roughness of the light-shielding layer 31 or the color filter 32.

The overcoat layer 33 is formed of a transparent resin material. The overcoat layer 33 is used as a base and covered with the second perpendicular alignment film AL2.

The first perpendicular alignment film AL1 and the second perpendicular alignment film AL2 are each formed of a material which exhibits perpendicular alignment properties, and have the alignment regulating power to align liquid crystal molecules in a normal direction to the substrate without requiring an alignment process such as rubbing.

The array substrate AR and the counter-substrate CT described above are arranged so that the first perpendicular alignment film AL1 and the second perpendicular alignment film AL2 face each other. Between the array substrate AR and the counter-substrate CT, a predetermined cell gap is formed of a pillar-shaped spacer formed on one of the substrates. The array substrate AR and the counter-substrate CT are attached together with a sealing material while the cell gap being formed therebetween. The liquid crystal layer LQ is filled in the cell gap between the first perpendicular alignment film AL1 and the second perpendicular alignment film AL2.

A backlight BL is provided on a back side of the liquid crystal display panel with the above-described structure. As the backlight BL, various types are applicable, but an explanation on the detailed structure thereof is omitted.

On an external surface of the first insulating substrate 10, a first optical element comprising a first polarizer PL1 is provided. On an external surface of the second insulating substrate 30, a second optical element comprising a second polarizer PL2 is provided. The first polarizing plate PL1 and the second polarizing plate PL2 are arranged, for example, in a crossed-Nicol positional relationship in which the polarization axes are perpendicular to each other.

In the above-described embodiment, the first set of a red (first color) pixel, a green (second color) pixel and a blue (third color) pixel, and the second set of a red (first color) pixel, a green (second color) pixel and a white pixel are each defined as a composite color unit pixel. In this display device, odd-numbered gate lines and even-numbered gate lines are arranged for composite color unit pixels arranged in odd-numbered rows and even-numbered rows, respectively. Here, the above-described blue (third color) pixels and the white (fourth color) pixels are connected alternately to the odd-numbered gate lines and even-numbered gate lines every other composite color unit pixel. That is, such a pattern is formed along the first direction that the pixels of the same color in the third column (for example, blue or white) are connected to the respective gate lines. In the composite color unit pixel (COL3) located at the first or second one along the first direction from a composite color unit pixel (COL1) to which a pixel of the third column belongs, odd-numbered gate lines and even-numbered gate lines are alternately selected to connection for third pixel or forth pixel.

Figure 7:
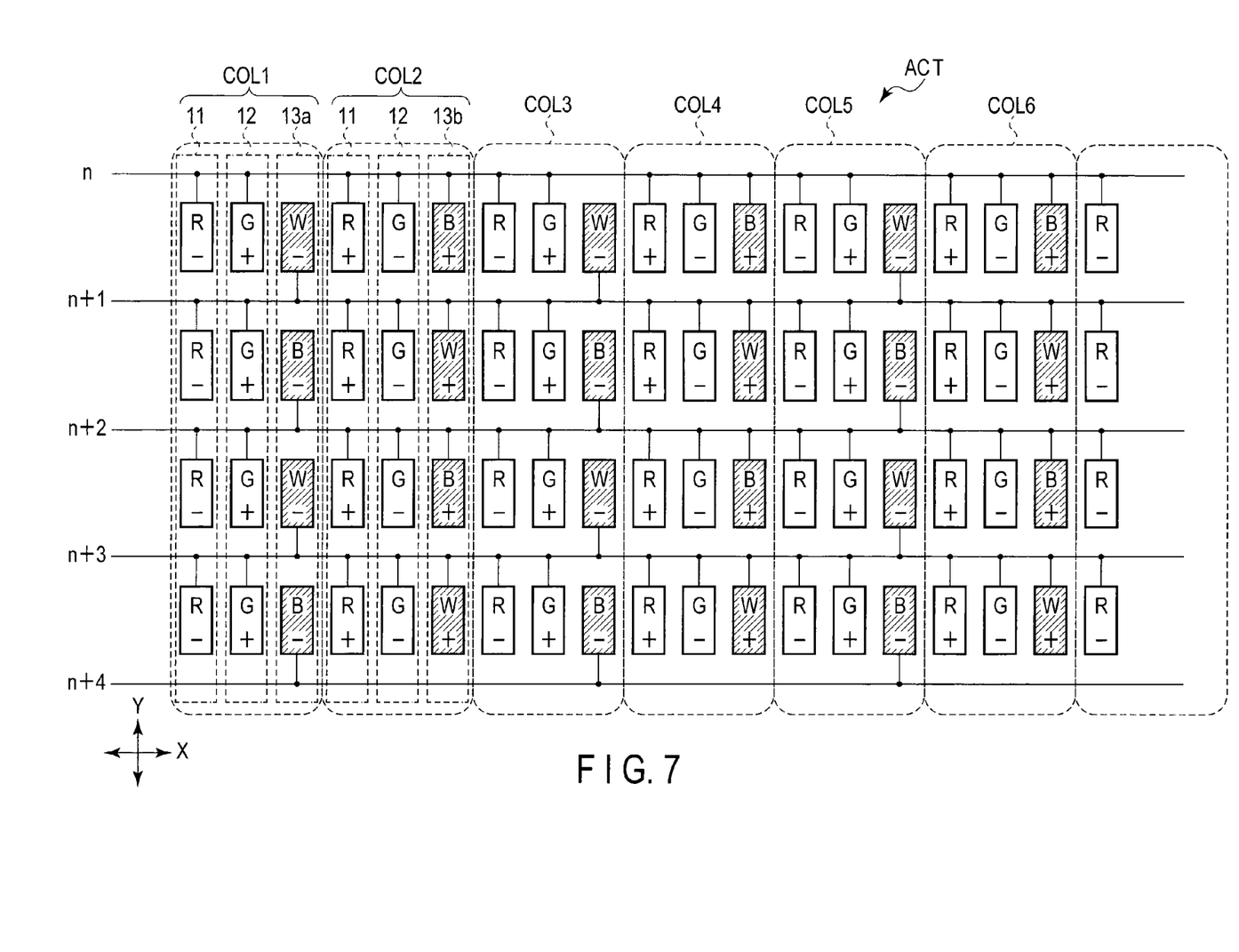
FIG. 7 is a diagram showing another embodiment.

The embodiment is not limited to that described above. FIG. 7 shows another embodiment.

With reference to FIG. 7, the arrangement pattern of the color pixels will now be described. Three columns comprising the first column of red pixels (R), the second column of green pixels (G) and the third column of blue pixels (B) and white pixel (W) alternately disposed are provided repeatedly along the first direction. In this embodiment as well, the first set of the red pixel (R), green pixel (G) and blue pixel (B) arranged along the first direction, and the second set of the red pixel (R), green pixel (G) and a white pixel (W) are each defined as a composite color unit pixel. Further, for the pixels of the odd-numbered rows and even-numbered rows, the odd-numbered gate lines and even-numbered gate lines are arranged to correspond to the respective pixels.

Here, such a pattern is formed along the first direction that those pixels in the third column, that are adjacent to each other along the first direction (the blue pixel (B) and white pixel (W)) are connected to the respective gate lines. In this pattern, these pixels are connected alternately to odd-numbered gate lines and even-numbered gate lines.

At the sixth column of the first row, the blue pixel (B) of the column COL2 of the composite color pixels is connected to an odd-numbered gate line (n). The white pixel (W) next to this, which is in the column COL3 of the composite color pixels, is connected to an even-numbered gate line (n+1). Furthermore, the blue pixel (B) next to this, which is in the column COL4 of the composite color pixels, is connected to the odd-numbered gate line (n). Then, the white pixel (W) next to this, which is in the column COL5 of the next composite color pixels, is connected to the even-numbered gate line (n+1).

The display device with the above-described structure can exhibit the following advantageous effects. That is, let us suppose that pixel signals of the same potential are written in all of the pixels.

In the above-described arrangement pattern of the pixels, a pixel signal is assumed to be written in the pixels of, for example, a gate line (n+1). In this case, when the polarities of the red pixels (R), green pixels (G) and white pixels (W) are totalized, the positive and negative polarities of the pixel signals are equalized and the polarity is not biased toward positive or negative. Thus, a stable reference potential can be maintained for the common electrode as well.

Moreover, let us suppose, for example, that a pixel signal is written in the pixels of a gate line (n+2). In this case, for each of the red pixels (R), green pixels (G) and blue pixels (B), the positive and negative polarities of the pixel signals are equalized and the polarity is not biased toward positive or negative.

Figure 8:
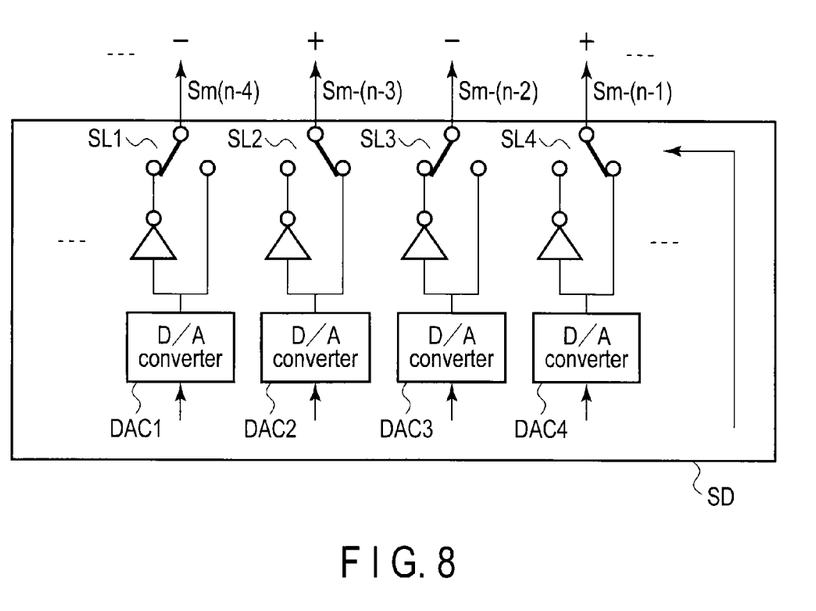
FIG. 8 is a schematic diagram illustrating a column inversion driving mode.

FIG. 8 shows in simplified form an example of the column-inversion drive scheme. The second driving circuit SD accommodate inside a plurality of circuits configured to convert digital pixel data to analog signals to be supplied to each pixel, amplify the analog pixel signals and to output the signals to the source lines. The figure shows, as a typical example, source lines Sm–(n–4) to Sm–(n–1). The figure also shows digital-to-analog converters DAC1-DAC4 configured to output pixel signals to the source line Sm–(n–4) to Sm–(n–1), respectively. The output pixel signals of the digital-to-analog converters DAC1 to DAC4 are produced in the forms of positive-polarity pixel signals and negative-polarity pixel signals. One of the positive-polarity and negative-polarity pixel signals of the digital-to-analog converter DAC1 is selected by a switch SL1 and output to the source line Sm–(n–4). Similarly, one of the positive-polarity and negative-polarity pixel signals of the digital-to-analog converter DAC2 is selected by a switch SL2 and output to the source line Sm–(n–3). Further, one of the positive-polarity and negative-polarity pixel signals of the digital-to-analog converter DAC3 is selected by a switch SL3 and output to the source line Sm–(n–2). Furthermore, one of the positive-polarity and negative-polarity pixel signals of the digital-analog converter DAC4 is selected by a switch SL4 and output to the source line Sm–(n–1).

Here, by the selection mode of the switches SL1 to SL4, the column polarity inversion is carried out.

Note that the embodiments provided above are described in connection with the FFS mode, in which pixel electrodes comprise slits and liquid crystal molecules are driven between pixel electrodes and a common electrode. But, the embodiments are not limited to such a drive mode, and other systems, for example, in-plane switching (IPS) mode may be employed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display comprising:
three columns of a first column of first color pixels, a second column of second color pixels, and a third column of third color pixels and fourth color pixels arranged alternately, the three columns being repeatedly provided along a first direction, a first set of a first color pixel, a second color pixel and a third color pixel along the first direction, and a second set of a first color pixel, a second color pixel and a fourth color pixel along the first direction being each defined as a composite color unit pixel; and
gate lines comprising odd-numbered and even-numbered gate lines, arranged to correspond to color pixels of odd-numbered rows and even-numbered rows,
wherein
the first color pixel, the second color pixel, the third color pixel and the fourth color pixel are different in color,
in the composite color unit pixel located along the first direction, with respect to the color pixels of the respective third columns, a connection pattern is designed such that the pixels of the third columns of the same color are connected to the odd-numbered gate lines and the even-numbered gate lines, alternately, along the first direction.

2. The liquid crystal display of claim 1, wherein the first color pixel is a red pixel, the second color pixel is a green pixel, the third color pixel is a blue pixel and the fourth color pixel is a white pixel.

3. The liquid crystal display of claim 2, wherein the third columns each comprise blue pixels and white pixels, and in second composite color unit pixels along the first direction from the composite color unit pixels to which the white pixels belong, the white pixels are connected to the odd-numbered gate lines and the even-numbered gate lines, alternately, along the first direction.

4. The liquid crystal display of claim 2, wherein the third columns each comprise blue pixels and white pixels, and in first composite color unit pixels along the first direction from the composite color unit pixels to which the blue and white pixels belong, the blue and white pixels are connected to the odd-numbered gate lines and the even-numbered gate lines, alternately, along the first direction.

5. The liquid crystal display of claim 2, wherein a width of the third column along the first direction is greater than that of each of the first and second columns along the first direction.

6. The liquid crystal display of claim 2, wherein an area of two red pixels or two green pixels is substantially equal to an area of one blue pixel.

7. The liquid crystal display of claim 1, wherein the third columns each comprise blue pixels and white pixels, and in second composite color unit pixels from the composite color unit pixels to which the blue pixels belong along the first direction, the blue pixels are connected to the odd-numbered gate lines and the even-numbered gate lines, alternately, along the first direction.

8. The liquid crystal display of claim 1, further comprising:
- source lines arranged respectively between each pair of the first column and the second column, the second column and the third column, and the third column and the first column;
- switching elements each comprising a source electrode and a drain electrode; and
- pixel electrodes,
- wherein the source electrode of each switching element is connected to a corresponding source line through a first contact hole,
- and the drain electrode of the switching element is connected to a corresponding pixel electrode through a second contact hole,
- and wherein the second contact hole is located below the corresponding pixel electrode, and the first contact hole and the second contact hole are arranged in different rows so that one of the gate lines is positioned between the first contact hole and the second contact hole.

9. The liquid crystal display of claim 1, wherein
the first color pixel is a red pixel, the second color pixel is a green pixel, the third color pixel is a blue pixel and the fourth color pixel is a white pixel, and the pixel electrode of the red pixel, the pixel electrode of the green pixel and the pixel electrode of the white pixel have areas which can be accommodated in a first region defined by respective source lines and respective gate lines.

10. The liquid crystal display of claim 1, wherein
the first color pixel is a red pixel, the second color pixel is a green pixel, the third color pixel is a blue pixel and the fourth color pixel is a white pixel, and the pixel electrode of the blue pixel includes a connecting portion which extends out from a first region defined by the respective source lines and the respective gate lines and enters a second region in a next row to the first region, and
the pixel electrode of the blue pixel is connected to a corresponding source line as a source electrode of a switching element is connected to the corresponding source line via a first contact hole, and a drain electrode of the switching device is connected to the connecting portion through a second contact hole, different from the first contact hole, located below the connecting portion and in a next row.

* * * * *